United States Patent [19]

Eresen et al.

[11] 4,233,272

[45] Nov. 11, 1980

[54] PROCESS FOR SELECTIVE SEPARATION OF URANIUM FROM SOLUTIONS BY MEANS OF AN ION EXCHANGER

[75] Inventors: Nahit Eresen, Bonn; Klaus Schröer, Bonn-Tannenbusch; Hans J. Becker, Cologne, all of Fed. Rep. of Germany

[73] Assignee: Uranerzbergbau GmbH, Bonn, Fed. Rep. of Germany

[21] Appl. No.: 806,466

[22] Filed: Jun. 14, 1977

[30] Foreign Application Priority Data

Jun. 19, 1976 [DE] Fed. Rep. of Germany ....... 2627540

[51] Int. Cl.² ............................................. C01G 43/00
[52] U.S. Cl. ........................................ 423/7; 423/11; 423/18; 423/20
[58] Field of Search ........................... 423/7, 11, 18, 20

[56] References Cited

U.S. PATENT DOCUMENTS

| | | | |
|---|---|---|---|
| 3,268,288 | 8/1966 | Goren | 423/18 |
| 3,880,980 | 4/1975 | Wamser | 423/7 |
| 3,953,568 | 4/1976 | Seke et al. | 423/7 |
| 3,998,924 | 12/1976 | Jones et al. | 423/7 |
| 4,002,716 | 1/1977 | Sundar | 423/11 |

FOREIGN PATENT DOCUMENTS

| | | | |
|---|---|---|---|
| 39-20641 | 9/1964 | Japan | 423/7 |
| 1115797 | 5/1968 | United Kingdom | 423/7 |

*Primary Examiner*—Edward A. Miller
*Attorney, Agent, or Firm*—Burns, Doane, Swecker & Mathis

[57] ABSTRACT

A process for selectively removing tetravalent and/or hexavalent uranium ions from a solution by using a chelate-forming cation exchanger. The solution may be prepared by contacting uranium bearing ore with either an acid or a dilute carbonate or bicarbonate solution. To facilitate removal of the uranium ions, the solution may have a pH value greater than 1.0 and a redox potential of from −50 to +250 mV.

8 Claims, 1 Drawing Figure

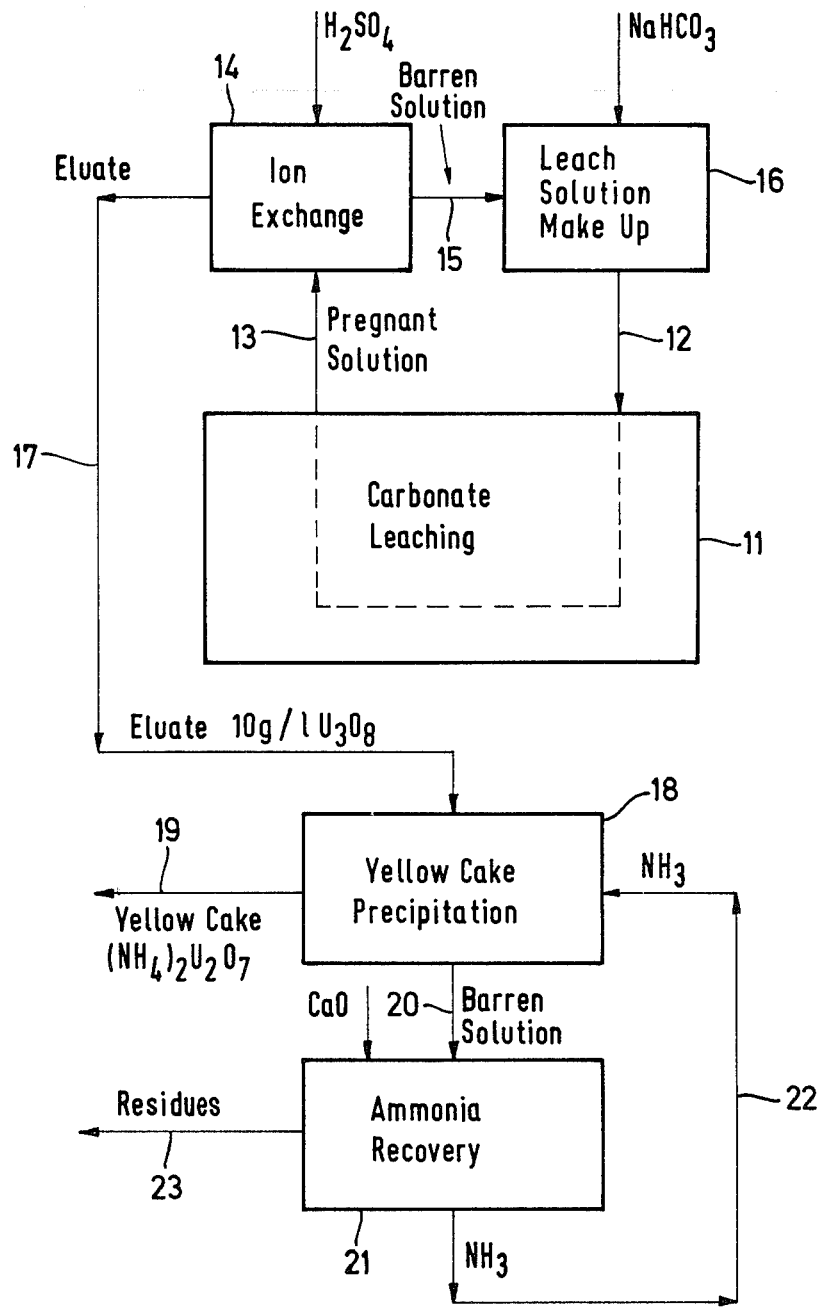

4,233,272

PROCESS FOR SELECTIVE SEPARATION OF URANIUM FROM SOLUTIONS BY MEANS OF AN ION EXCHANGER

BACKGROUND OF THE INVENTION

1. Field of the Invention

The invention relates to a process for the selective separation of uranium from solutions by means of an ion exchanger.

2. Description of the Prior Art

It is known to use ion exchangers for removing uranium ions from solutions. However, it has been found that in certain cases this cannot be done, either because the uranium is not present in the solution in a form permitting adsorption by an ion exchanger, or because the use of an ion exchanger results in problems of environmental protection, or because the solution also contains ions that interfere with or make impossible an effective process of ion exchange.

OBJECTS AND SUMMARY OF THE INVENTION

The invention therefore proposes the separation of tetravalent and/or hexavalent uranium by means of chelateforming cation exchangers.

The invention can be advantageously used, for example, for the separation of uranium from solutions that may particularly contain nickel, iron, arsenic, aluminum and magnesium.

The uranium minerals of a deposit generally contain uranium in tetravalent as well as in hexavalent form. The decomposition of uranium-bearing ores can be brought about by means of either acid or alkaline leaching solutions. In the case of acid decomposition, it is customary to use sulfuric acid so that a uranium sulfate solution is obtained. It is essential that the decomposition effecting solution usually take place under oxidizing conditions, whereby any tetravalent uranium present is converted to hexavalent uranium. Oxidizing conditions are generally necessary in order to reduce the duration of the leaching process, i.e., the decomposition of the ore at a given yield to an economically acceptable level. In any case, these conditions result in practically all the uranium eventually present in the solution being in hexavalent form. This is a prerequisite for the possibility of separating the uranium in a known manner by means of an anion exchanger.

When the uranium is present upon decomposition in partially or predominantly tetravalent form, an anion exchanger cannot be applied directly. Tetravalent uranium can be present when the leaching of the uranium ore is not carried out under oxidizing conditions. This is possible in the case of certain uranium containing ores. Tetravalent uranium can be present in the solution, not only upon decomposition of the ore, but also when the solution is for whatever reason subjected to an intermediate treatment that has a reducing effect. This may be the case, for example, when the ore to be decomposed contains admixtures that must initially be either precipitated by suitable treatments, or otherwise rendered unreactive toward the further process steps. Conditions like these may exist when an ore deposit contains, for example, arsenic, copper, molybdenum or lead. By adhering to certain conditions with regard to temperature, pressure and pH value, it is possible to precipitate these elements as sulfides from acid solutions with the aid of hydrogen sulfide, and so to separate them selectively from uranium and also from nickel. This procedure, however, results in a partial reduction of the uranium—and also of any iron present—with the result that, depending upon the selected conditions upon sulfide precipitation the uranium is present either partially or predominantly in tetravalent form and the iron in divalent form. It is feasible to oxidize the uranium anew by the addition of oxidation agents. In this manner, any iron and other admixtures present would also be oxidized. This oxidation requires however, an additional process step and further demands the use of additional oxidation agents.

It is therefore an object of this invention to provide a process of the described kind which permits the separation of tetravalent uranium directly from the solution obtained from the decomposition, without requiring any oxidation of this tetravalent uranium. Moreover, separation from certain undesired substances is aimed at in a manner that these will not be taken up by the ion exchanger.

BRIEF DESCRIPTION OF THE DRAWING

The drawing shows the flow sheet of one aspect of the present invention wherein uranium bearing ore is contacted with a bicarbonate solution and uranium is recovered from the resulting pregnant solution.

DESCRIPTION OF THE PREFERRED EMBODIMENTS

To achieve the above objects the present invention proposes the joint separation of tetravalent and hexavalent uranium by means of chelate-forming cation exchangers while maintaining a redox potential of from $-50$ to $+250$ mV, preferably of from $+50$ to $+150$ mV, and a pH value greater than 1.

Before separation of the uranium, the acid solution may be subjected to a treatment for the precipitation of components that results in the reduction of at least part of the uranium and, as the case may be, of other components present. One of such elements may be arsenic, for example, which occurs in the ore in combination with iron, nickel and/or sulfur. The arsenate ($AsO_4^{3-}$) that is produced in an acid, oxidizing decomposition is precipitated with hydrogen sulfide ($H_2S$) as arsenic sulfide ($As_2S_3$) at pH values greater than 0.5. It is essential that in this fashion all of the arsenic can be precipitated, and in this it is advantageous to carry out the precipitation at a pressure of 1 to 4 bar at a temperature of approximately 50°–100° C. An increase in pressure results in an increase in the speed with which the precipitation takes place and thus reduces the time required for it.

An essential advantage of the process according to the present invention is that the said cation exchangers do not tie up any arsenic, so that even in a case of breakdown of the process step effecting the separation of the arsenic, the final product containing the uranium is free from arsenic. This applies likewise to divalent iron, so that also with a preliminary reducing step a selective separation of uranium and iron takes place. Moreover, the cation exchanger offers the advantage that it is insensitive toward anions that would result in a poisoning of the anion exchange resins. This is of significance because in particular in the case of the precipitation of arsenic or similar elements as sulfides, poisons such as polythionate and sulfite can be produced.

In the separation of uranium, the maintanance of a pH value of from 1.5 to 2.5 has shown itself to be particularly advantageous because this provides a high load capacity of the exchange resin for uranium on the one hand and, on the other hand, a sufficient degree of non-absorption of nickel, aluminum and magnesium by the exchange resin is provided.

The elution of the tetra- and hexavalent uranium can be carried out by means of a 5-15% sulfuric acid. The tetra- and hexavalent uranium can be precipitated from the eluate by means of conventional reagents as a mixture of diuranate and uranium (IV)-hydroxide.

The possibility of a most extensive selective separation of tetravalent uranium from solutions by means of a chelate-forming cation exchanger is confirmed by the following test results:

1. Joint separation of $UO_2{}^{2+}$ and $U^{4+}$

A synthetic solution was prepared which contained 6 g.l$^{-1}$ $UO_2{}^{2+}$, 4 g.l$^{-1}$ $Ni^{2+}$, 3 g.l$^{-1}$ $Fe^{2+}$, 3 g.l$^{-1}$ $Al^{3+}$, 50 g.l$^{-1}$ $NH_4{}^+$. $UO_2{}^{2+}$ was partially reduced to $U^{4+}$ by the addition of 5 g.l$^{-1}$ of magnesium. Upon adjusting the pH value to 1.8 or 2, there were provided for each liter of this solution four columns containing 100 ml of chelate-forming cation exchanger resin. The resin originated from two different supply sources. In all cases more than 99% of the uranium was bound by the resin. The nickel portion adsorbed by the resin amounted to less than 3% and the iron portion to less than 1%.

2. Adsorption of $U^{4+}$

A solution of 6 g.l$^{-1}$ $UO_2{}^{2+}$ was reductively treated with magnesium with heat and uranium was converted almost completely into tetravalent form ($U^{4+}$). Upon adjusting the pH value of 2.0, 500 ml of this solution were fed to the columns of ion exchangers (100 ml of resin from two different supply sources). More than 99.5% of the uranium remained in the exchange columns.

According to a further embodiment of this invention, the chelate-forming cation exchangers can also be used for separating uranium from preferably weakly acid or weakly alkaline solutions, wherein uranium is dissolved in the form of carbonato complexes. In this case, the uranium-containing solutions consist of diluted carbonate or bicarbonate solutions containing ions of sodium, calcium, magnesium, or ammonia in the first line. Since the exchangeable groups of the resin may be either hydrogen or any one of the aforenoted cations, depending upon the intended use, it is assured that no foreign cations can enter the discharging solutions (effluent) during the charging phase.

The leaching of the uranium may be carried out with the aid of solutions containing sodium hydrogen carbonate [Na(HCO$_3$)]. In this the uranium contained in the ore then reacts according to equation (1) and goes into solution by forming carbonato complexes:

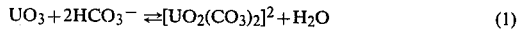
(1)

As solvent one may also use calcium hydrogen carbonate [Ca(HCO$_3$)$_2$] or ammonia hydrogen carbonate [NH$_4$HCO$_3$].

The drawing shows the flow sheet of a recovery of uranium from carbonate solutions. At 11 the uranium ore is leached by means of a solution containing sodium hydrogen carbonate which is charged through a line 12. The pregnant solution is passed through a line to the cation exchanger 14. The dissolved uranium that is contained in the pregnant solution is selectively adsorbed. Resins suitable for this process and for the other processes described in this application are, for instance, "Lewatit TP 207" of Bayer AG, Leverkusen as well as "Amberlit XE 318" of Rohm & Haas, Philadelphia, Pennsylvania (USA).

The barren solution is passed through a line 15 into a device 16 for making up the leach solution.

The cation exchanger 14 is eluted by means of a sulfuric solution. The uranium is passed through a line 17 into a device 18, where it may be precipitated with ammonia. The resulting yellow cake is removed through a line 19. The remaining barren solution is passed through a line 20 into a device 21 for regaining the ammonia which is returned through a line 22 to the device 18. Any residues are discharged from the circulation through a line 23.

The reactions taking place in the cation exchanger 14 do not permit any ions harmful to the environment to reach the circulation of the leach, because the uranyl ions ($UO_2{}^{2+}$) are exchanged for hydrogen ions:

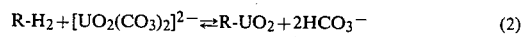
(2)

Reaction (2) represents the exact reversal of reaction (1) so that the leach theoretically returns to its original condition after the ion exchange. This means that carbonate solutions, once available, can be returned to the leaching process in the device 11 as often as desired, either without or with a little make-up, provided that in the leaching process no further reactions other than reaction (1) take place.

The specific advantage of the chelate-forming cation exchangers consists in that these exchangers act selectively toward different ions that are contained in the solution. This is essentially due to the fact that cation exchangers of this kind comprise resins with built-in chelate-forming compounds which are capable for forming a particularly stable complex with uranium ions, irrespective of whether these are tetra-or hexavalent.

We claim:

1. A process for obtaining uranium from an ore containing uranium and arsenic comprising:
   (a) contacting the ore with an acid under oxidizing conditions to thereby form a pregnant liquor containing uranium and arsenate;
   (b) contacting the pregnant liquor with hydrogen sulfide to precipitate arsenic sulfide;
   (c) in the absence of an oxidizing step, contacting the hydrogen sulfide treated liquor with a chelate-forming cation exchanger; and
   (d) recovering uranium from the chelate-forming cation exchanger.

2. The process of claim 1 wherein the liquor has a pH value greater than 1.0 and a redox potential of from −50 to 250 mV.

3. The process of claim 18 wherein the arsenic sulfide is precipitated at a pressure of from 1 to 4 bar and at a temperature of approximately 50° to 100° C.

4. The process of claim 3 wherein the uranium is recovered from the chelate-forming cation exchanger by eluting the exchanger with 5-15 percent sulfuric acid and precipitating the uranium from the eluate.

5. A process for obtaining uranium from an ore containing uranium and a material selected from the group consisting of arsenic, copper, molybdenum and lead comprising:
   (a) contacting the ore with an acid under oxidizing conditions to thereby form a pregnant liquor containing uranium and the material;

(b) contacting the pregnant liquor with hydrogen sulfide to precipitate a sulfide of the material;

(c) in the absence of an oxidizing step, contacting the hydrogen sulfide treated liquor with a chelate-forming cation exchanger; and (d) recovering uranium from the chelate-forming cation exchanger.

6. The process of claim 1 wherein the liquor has a pH value greater than 1.0 and a redox potential of from −50 to 250 mV.

7. The process of claim 2 wherein the sulfide of the material is precipitated at a pressure of from 1 to 4 bar and at a temperature of approximately 50° to 100° C.

8. The process of claim 3 wherein the uranium is recovered from the chelate-forming cation exchanger by eluting the exchanger with 5–15 percent sulfuric acid and precipitating the uranium from the eluate.

* * * * *